(12) United States Patent
Schmitt et al.

(10) Patent No.: US 12,514,177 B2
(45) Date of Patent: Jan. 6, 2026

(54) PLANT GROWTH ASSEMBLY COMPRISING A NUTRIENT DOSING SYSTEM

(71) Applicant: FARM3, Besancon (FR)

(72) Inventors: Romain Schmitt, Besancon (FR); Eliott Vacher, Besancon (FR)

(73) Assignee: FARM3, Besancon (FR)

( * ) Notice: Subject to any disclaimer, the term of this patent is extended or adjusted under 35 U.S.C. 154(b) by 27 days.

(21) Appl. No.: 18/183,507

(22) Filed: Mar. 14, 2023

(65) Prior Publication Data
US 2023/0284575 A1  Sep. 14, 2023

(30) Foreign Application Priority Data
Mar. 14, 2022 (EP) ..................................... 22305291

(51) Int. Cl.
*A01G 31/00* (2018.01)
*A01G 31/02* (2006.01)

(52) U.S. Cl.
CPC .................................... *A01G 31/02* (2013.01)

(58) Field of Classification Search
CPC .... A01G 31/00; A01G 31/008; A01G 31/011; A01G 31/065
See application file for complete search history.

(56) References Cited

U.S. PATENT DOCUMENTS

| | | | |
|---|---|---|---|
| 10,750,687 B2 * | 8/2020 | Everett | A01G 27/003 |
| 2019/0021247 A1 * | 1/2019 | Boerema | A01G 31/00 |
| 2020/0060108 A1 * | 2/2020 | Goldsmith | A01G 31/06 |
| 2020/0163297 A1 | 5/2020 | Newitt | |

FOREIGN PATENT DOCUMENTS

| | | | | |
|---|---|---|---|---|
| EP | 363168 A | * | 4/1990 | ............. A01G 31/00 |
| EP | 0363168 A2 | | 4/1990 | |
| EP | 0605063 A | | 7/1994 | |
| EP | 605063 A1 | * | 7/1994 | ............. A01G 31/00 |
| GB | 2487153 A | | 7/2012 | |
| KR | 20130014097 A | * | 2/2013 | |
| WO | 2018172947 A1 | | 9/2018 | |

OTHER PUBLICATIONS

European Search Report issued Aug. 1, 2022, in corresponding European Patent Application 22305291.1, 2 pages.

* cited by examiner

*Primary Examiner* — Kristen C Hayes
(74) *Attorney, Agent, or Firm* — Maier & Maier, PLLC

(57) ABSTRACT

A nutrient dosing system including: a mixing tank for receiving a solvent and at least one nutrient medium; and at least one dosing device, each dosing device being fluidly connected to the mixing tank. Each dosing device includes a nutrient tank for storing a nutrient medium, a reciprocating pump having an inlet port fluidly connected to the corresponding nutrient tank, and an outlet port fluidly connected to the mixing tank, and an actuator configured to actuate the reciprocating pump. The nutrient dosing system also includes a controller configured to, for at least one dosing device, control the respective actuator to cause the corresponding reciprocating pump to: load the nutrient medium from the corresponding nutrient tank; and inject a target amount of nutrient medium into the mixing tank.

10 Claims, 4 Drawing Sheets

PLANT GROWTH ASSEMBLY COMPRISING A NUTRIENT DOSING SYSTEM

FIELD

The invention concerns a nutrient dosing system.

The invention further relates to a plant growth assembly. The invention also relates to a nutrient dosing method.

The invention relates to the field of horticulture, more particularly to the field of soilless culture.

BACKGROUND

Soilless culture is a method of growing plants without soil. For instance, in hydroponics, plants are arranged so that their roots are directly in contact with a nutrient solution. Support of the roots may be performed by an inert medium such as sand.

As another example, in aeroponics, plants are arranged in corresponding growth cells so that their roots are exposed to the air. In this case, droplets of nutrient solution are continuously or discontinuously provided to the roots to promote plant growth.

In both cases, due to the absence of soil, plants spend less energy to absorb water through their roots. As a result, the development of the upper parts of the plant (stems, leaves, fruits, etc.) is promoted, thereby increasing yield while reducing water and nutrient use.

Such nutrient solutions are generally obtained by dissolving a nutrient medium in water.

Since nutrient requirements of a plant vary depending on its type and/or growth stage, a composition of the nutrient solution that is provided to the plant needs to be precise and repeatable.

However, the design of automated dosing systems for automatically preparing such nutrient solutions is difficult. Indeed, available nutrient media are generally viscous. As a result, such nutrient media tend to clog pipes of automated dosing systems, thereby compromising preciseness and repeatability. The formation and the accumulation of crystals (which include nutrients) is also an issue.

Furthermore, it cannot be envisaged to dilute such nutrient media in a solvent (such as water) to provide a pre-dosed nutrient solution that would be less viscous that the original nutrient medium and that would, therefore, not result in clogging. Indeed, once diluted, the nutrients tend to degrade quickly over time, which would comprise the efficiency of such pre-dosed nutrient solution.

A purpose of the invention is to provide a nutrient dosing system that is able to provide a nutrient solution having a composition that is precise and repeatable over time.

SUMMARY

To this end, the present invention is a plant growth assembly comprising:
- at least one growth enclosure for housing plants, and
- at least one nutrient dosing system fluidly connected to the at least one growth enclosure, the nutrient dosing system comprising:
    - a mixing tank for receiving a solvent and at least one nutrient medium;
    - at least one dosing device, each dosing device being fluidly connected to the mixing tank, each dosing device comprising:
        - a nutrient tank for storing a nutrient medium;
        - a pump having an inlet port fluidly connected to the corresponding nutrient tank, and an outlet port fluidly connected to the mixing tank; and
        - an actuator configured to actuate the pump;
    - a controller wherein, for each dosing device, the pump is a reciprocating pump for providing a pushing force through a positive displacement of the reciprocating pump, wherein the mixing tank is fluidly connected to a nutrient solution storing tank configured for storing at least one nutrient solution wherein the nutrient dosing system comprises at least one sensor configured to output a measurement signal representing at least:
- an electroconductivity of the nutrient solution in the nutrient solution storing tank; and
- whether a free surface of the nutrient solution in the nutrient solution storing tank is below a predetermined trigger level, wherein the controller is configured to, for at least one dosing device and based on the measurement signal, control the respective actuator to cause the corresponding pump to:
- load the nutrient medium from the corresponding nutrient tank; and
- inject a target amount of nutrient medium into the mixing tank
- transfer the concentrated nutrient solution to the nutrient solution storing tank wherein the growth enclosure is configured to pulverize, on said plants, the nutrient solution stored in the nutrient solution storing tank, wherein the nutrient solution storing tank is further configured to recuperate the nutrient solution not absorbed by the plants.

Indeed, the positive displacement that is inherent to the operation of a reciprocating pump provides a pushing force that forces progression of the nutrient medium in the tubing of the nutrient dosing system, thereby flushing potential clogs and crystal clusters. As a result, the performances of the nutrient dosing system remain nominal, and nutrient dosing is consistent over time. Such reciprocating pumps also allow for a precise dosing.

Furthermore, such design allows for individual dosing of each nutrient. This design also allows to conveniently add or remove dosing devices, thereby adjusting the number of nutrients that can be individually dosed.

Moreover, the presence of the mixing tank and of the nutrient solution storing tank is advantageous compared to the injection of concentrated nutrient solution directly in the flow of nutrient solution that is distributed to the roots. Indeed, the mixing tank allows complete homogenization of the concentrated nutrient solution before the transfer of the homogenized solution in the nutrient solution storing tank. The measure of the electroconductivity inside the nutrient solution storing tank instead of in the flow of the solution after the distribution of the plants or in a sample of the solution allows a measure that is averaged in the whole volume of the solution in the nutrient solution storing tank. This results in a measure that are more precise and less subject to local variations so that error on the measure is reduced and the preparation of the concentrated nutrient solution is more precise.

Furthermore, when a plurality of nutrient solution storing tanks are connected in parallel to the same nutrient dosing system, the measure of electroconductivity in each nutrient solution storing tank allows to adjust the injection of concentrated nutrient solution to the need of the different plants supplied by the different nutrient solution storing tank. Indeed, some plants retain more nutrients while not reducing a lot the volume of the solution. Conversely, other plants retain more water of the solution but do not retain much nutrients. The combined measure of the electroconductivity and level of solution allows to adjust the injection of water or nutrient specifically to each plant.

According to another advantageous aspect of the invention, the controller is further configured to, if the electroconductivity of the solution in the nutrient solution storing tank is outside a predetermined range, and the level of the solution in the nutrient solution storing tank is above the predetermined trigger level:
- control each dosing device to inject a target amount of nutrient medium into the mixing tank so as to obtain a concentrated solution having a nutrient concentration that is higher than a target concentration associated to the solution in the nutrient solution storing tank; and
- control a transfer of the obtained concentrated solution from the mixing tank to the nutrient solution storing tank.

According to other advantageous aspects of the invention, the nutrient dosing system includes one or more of the following features, taken alone or in any technically possible combination:
- for at least one dosing device, the actuator is a linear actuator configured to move a movable part of the pump relative to a chamber of the pump in a first direction to force transfer of the nutrient medium from the nutrient tank to the pump, or in a second direction to force transfer of the nutrient medium from the pump to the mixing tank;
- the linear actuator is a screw actuator including a nut coupled to a threaded rod, the movable part of the pump being fixed to the nut, and the chamber of the pump being fixed to a support element of the threaded rod;
- the linear actuator comprises a pinion coupled to a rack to form a rack and pinion mechanism, the movable part of the pump being fixed to the rack, and the chamber of the pump being fixed to a support element of the pinion;
- the pump is single-acting reciprocating pump;
- the pump is single-acting reciprocating pump comprising a syringe and a Y-connector, a first port of the Y-connector being fluidly connected to a main port of the syringe, a second port of the Y-connector forming the inlet port of the pump and a third port of the Y-connector forming the outlet port of the pump, the Y-connector including a first check valve and a second check valve each arranged in a respective branch of the Y-connector to:
  - prevent flowing of nutrient medium between the first port and the outlet port when the nutrient medium flows from the inlet port to the first port; and
  - prevent flowing of nutrient medium between the first port and the inlet port when the nutrient medium flows from the first port to the outlet port;
- the mixing tank includes a mixer to agitate the solvent and each received nutrient medium;
- the measurement signal further represents at least:
  - a pH value of a solution in the mixing tank;
  - an electroconductivity of the solution in the mixing tank;
  - whether a free surface of the solution in the mixing tank is below a predetermined low level; and/or
  - whether the free surface of the solution in the mixing tank is above a predetermined high level, the controller being further configured to determine, based on the measurement signal, whether a solution in the mixing tank and/or the nutrient solution storing tank is compliant with a predetermined target composition;
- the controller is further configured to control, based on the measurement signal, an injection, in the mixing tank, of at least one of a pH regulation agent, at least one nutrient medium, and the solvent;
- the nutrient dosing system further comprises a cleaning tank configured to store a cleaning liquid, the cleaning tank being fluidly connected to the mixing tank, the controller being further configured to control, during a cleaning phase, an injection of cleaning liquid from the cleaning tank to the mixing tank.

The invention also relates to a nutrient dosing method including using a nutrient dosing system comprising:
- a mixing tank for receiving a solvent and at least one nutrient medium and fluidly connected to a nutrient solution storing tank configured for storing at least one nutrient solution;
- at least one dosing device, each dosing device being fluidly connected to the mixing tank, each dosing device comprising:
  - a nutrient tank for storing a nutrient medium;
  - a reciprocating pump having an inlet port fluidly connected to the corresponding nutrient tank, and an outlet port fluidly connected to the mixing tank; and
  - an actuator configured to actuate the pump;
- at least one sensor configured to output a measurement signal representing at least:
  - an electroconductivity of the nutrient solution in the nutrient solution storing tank; and
  - whether a free surface of the nutrient solution in the nutrient solution storing tank is below a predetermined trigger level;

the nutrient dosing method comprising, during a dosing step, controlling, based on the measurement signal, the actuator of at least one dosing device to cause the respective pump to:
- load the nutrient medium from the corresponding nutrient tank;
- inject a target amount of nutrient medium into the mixing tank so as to obtain a concentrated nutrient solution; and
- transfer the concentrated nutrient solution to the nutrient solution storing tank.

According to other advantageous aspects of the invention, the nutrient dosing method includes one or more of the following features, taken alone or in any possible combination:
- the nutrient dosing system is connected to the at least one growth enclosure for housing plants, the growth enclosure being configured to pulverize, on said plants, the nutrient solution stored in the nutrient solution storing tank, the nutrient solution storing tank being further configured to recuperate the nutrient solution not absorbed by the plants;
- the dosing step includes activating a mixer of the mixing tank to agitate the solvent and each nutrient medium injected in the mixing tank;
- the nutrient dosing method comprises determining whether a solution in the mixing tank is compliant with a predetermined target solution, based on a measurement signal representing at least:
  - a pH value of a solution in the mixing tank;
  - an electroconductivity of the solution in the mixing tank;

an electroconductivity of a solution in a nutrient solution storing tank in selective fluid connection with the mixing tank;

whether a free surface of the solution in the nutrient solution storing tank is below a predetermined trigger level;

whether a free surface of the solution in the mixing tank is below a predetermined low level; and/or whether the free surface of the solution in the mixing tank is above a predetermined high level;

the nutrient dosing method further includes a correction step comprising injecting, in the mixing tank, at least one pH regulation agent based on the measurement signal.

BRIEF DESCRIPTION OF THE DRAWINGS

The invention will be better understood with the attached figures, in which.

DETAILED DESCRIPTION

Figure 1:
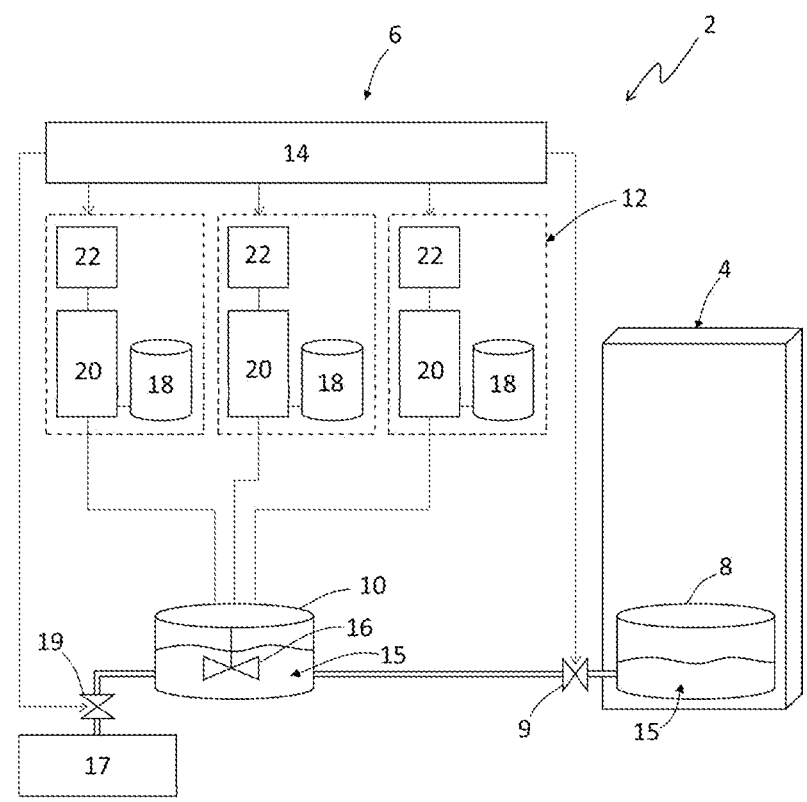
FIG. 1 is a schematic representation of a plant growth assembly according to the invention.

A plant growth assembly 2 according to the invention is shown of FIG. 1.

The plant growth assembly 2 includes at least one growth enclosure 4 for housing plants and promoting their growth, and at least one nutrient dosing system 6 for providing at least one nutrient solution of predetermined composition to the growth enclosure 4. More precisely, the nutrient dosing system 6 is fluidically connected to the at least one growth enclosure 4.

Such growth enclosure 4 is aimed at providing optimal growth conditions for the plants that it houses. For instance, plants are arranged in corresponding growth cells so that their roots are exposed. In this case, the growth enclosure 4 is configured to pulverize, on said roots, droplets of a nutrient solution received from the nutrient dosing system 6.

Preferably, each nutrient solution has a composition that depends, for instance, on a current growth stage of the plants in the growth enclosure 4. Alternatively, or in addition, the nutrient solution has a composition that depends on a predetermined nutrient delivery schedule.

The nutrient dosing system 6 is fluidically connected to a nutrient solution storing tank 8. Such nutrient solution storing tank 8 is configured for storing at least one nutrient solution. More precisely, the nutrient solution storing tank 8 may be configured to be installed in or to be fluidically connected to the growth enclosure 4 so that the growth enclosure 4 pulverize, on said roots, droplets of a nutrient solution stored in the nutrient solution storing tank 8. The nutrient solution storing tank 8 is further configured to recuperate the nutrient solution not absorbed by the roots.

If several growth enclosures 4 are comprised in the plant growth assembly 2, each growth enclosure 4 may comprise or may be fluidically connected to its own nutrient dosing system 6 or the overall growth enclosures 4 may be fluidically connected to the same nutrient dosing system 6, preferably in parallel.

For instance, a discharge valve 9 is arranged between the nutrient dosing system 6 and the nutrient solution storing tank 8 so as to selectively allow the nutrient solution to be discharged from the nutrient dosing system 6 to the nutrient solution storing tank 8 (open position of the discharge valve 9) or prevent allow the nutrient solution to flow between the nutrient dosing system 6 and the nutrient solution storing tank 8 (closed position of the discharge valve 9).

Figure 2:
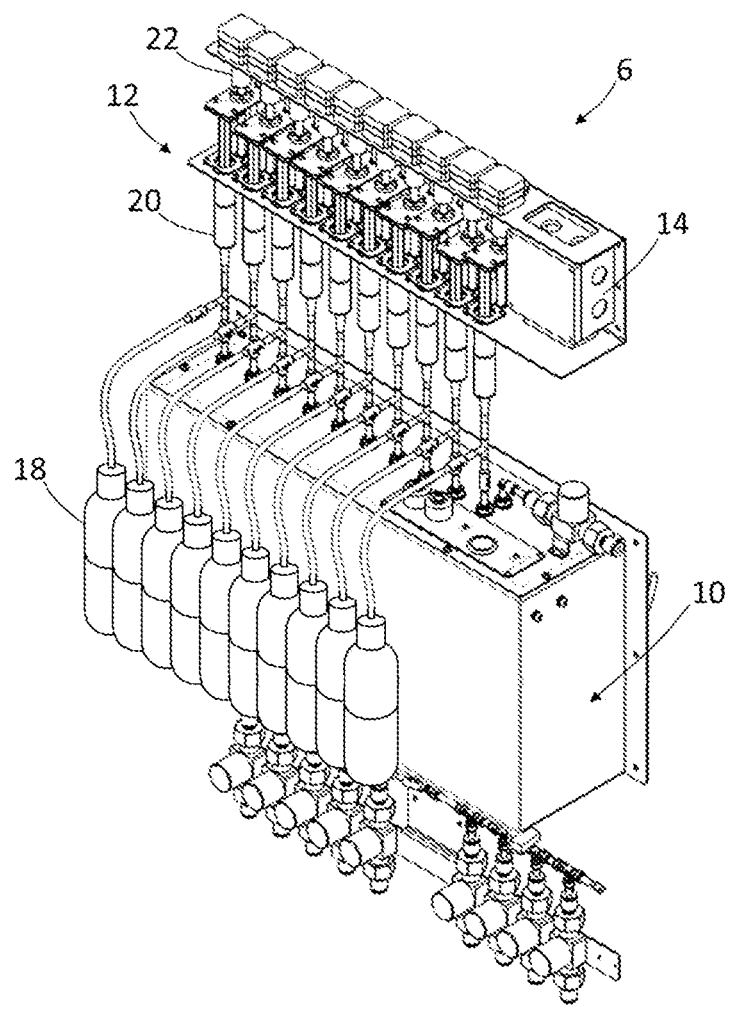
FIG. 2 is a schematic representation of a nutrient dosing system of the plant growth assembly of FIG. 1.

As shown on FIG. 2, the nutrient dosing system 6 comprises a mixing tank 10, at least one dosing device 12 fluidly connected to the mixing tank 10 and a controller 14. The nutrient dosing system 6 further comprises at least one sensor (not shown).

The mixing tank 10 is configured to contain a solvent, preferably water. The mixing tank 10 is further configured to receive nutrient media from the dosing devices 12. Consequently, solvation (i.e., dissolution) of each nutrient medium in the solvent results in a nutrient solution 15.

Furthermore, each dosing device 12 is configured to inject a predetermined amount of a given nutrient medium into the mixing tank 10. The amount and the nature of the nutrient medium injected in the mixing tank 10 depends on a target composition of the nutrient solution 15 in the mixing tank 10. As mentioned previously, said target composition depends, for instance, on a growth stage of the plants in the growth enclosure 4.

Moreover, each sensor is configured to output a corresponding measurement signal, as will be described below.

Finally, the controller 14 is configured to control operation of each dosing device 12.

Mixing Tank 10

As mentioned previously, the mixing tank 10 is configured to receive a solvent and at least one nutrient medium so that the nutrient solution 15 is obtained.

For instance, the mixing tank 10 is fluidly connected to a solvent supply 17, preferably through a solvent valve 19. The solvent valve 19 has an open position to allow flow of solvent from the solvent supply 17 to the mixing tank 10, and a closed position to prevent flow of solvent between the solvent supply 17 and the mixing tank 10.

Advantageously, the mixing tank 10 includes a mixer 16 to agitate the solvent and each received nutrient medium. This promotes solvation, in the solvent, of each received nutrient medium. As a result, the nutrient solution 15 is promptly obtained and can be directly transferred to the nutrient storing tank 8 of the growth enclosure 4. As a result, storing duration in the mixing tank 10 is reduced, and undesired decay of the nutrients in the mixing tank 10 is prevented. This is also particularly advantageous when the overall growth enclosures 4 are connected in parallel to the same nutrient dosing system 6. Indeed, for each growth enclosure 4, a dedicated nutrient solution 15 may be prepared in the mixing tank 10 and then provided to the corresponding growth enclosure 4. This thus reduces the total cost of the installation.

For instance, the mixer 16 includes a shaft having a first end coupled to a motor, an impeller being fixed to a second end of said shaft.

Sensors

Each sensor is configured to output a measurement signal. The measurement signal represents an electroconductivity of the nutrient solution in the nutrient solution storing tank 8 and whether a free surface of the nutrient solution in the nutrient solution storing tank 8 is below a predetermined trigger level.

Advantageously, the measurement signal may also represent at least one of:

a pH value of the nutrient solution 15 in the mixing tank 10;

an electroconductivity of the nutrient solution 15 in the mixing tank 10;

whether a free surface of the nutrient solution 15 in the mixing tank 10 is below a predetermined low level; and/or whether the free surface of the nutrient solution 15 in the mixing tank 10 is above a predetermined high level.

As will be discussed later, control of each dosing device 12 by the controller 14 depends on such measurement signal.

Dosing Device 12

As stated previously, each dosing device 12 is configured to inject a predetermined amount of a given nutrient medium into the mixing tank 10.

Each dosing device 12 comprises a nutrient tank 18, a pump 20 fluidly connected to the nutrient tank 18, and an actuator 22 configured to actuate the pump 20.

Nutrient Tank 18

The nutrient tank 18 is configured to store a nutrient medium. Such nutrient medium includes, for instance, one or a combination of phosphorus, nitrogen, potassium, calcium, sulfur, magnesium, micronutrients, organic fertilizer, and the like.

Advantageously, at least one nutrient tank 18 (hereinafter "pH regulation tank") does not store a nutrient medium, but rather a pH regulation agent. Such pH regulation agent is, for instance, a pH-down agent, able to decrease a pH of a solution to which said pH-down agent. As another example, such pH regulation agent is a pH-up agent, able to increase a pH of a solution to which said pH-up agent is added. Such pH-up and pH-down agents are known, per se, to the person skilled in the art.

Advantageously, at least one nutrient tank 18 (hereinafter "cleaning tank") does not store a nutrient medium, but rather a cleaning agent, such as a flush solution. Such flush solution is intended to dissolve crystals resulting from a crystallization of the nutrients. Such flush solution is known, per se, to the person skilled in the art.

Pump 20

The pump 20 includes an inlet port 24 fluidly connected to the corresponding nutrient tank 18, and an outlet port 26 fluidly connected to the mixing tank 10.

The pump 20 is a reciprocating pump. The positive displacement that is inherent to the operation of such pump forces progression of the nutrient medium in the tubing of the nutrient dosing system 6, thereby flushing potential clogs and crystal clusters. As a result, the performances of the nutrient dosing system 6 remain nominal, and nutrient dosing is consistent over time.

As is commonly known, the reciprocating pump 20 includes a chamber and a movable part.

The pump 20 is connected to the nutrient tank 18 so that movement, in a first direction, of the movable part of the pump 20 relative to the chamber of the pump 20 forces transfer of the nutrient medium from the nutrient tank 18 to the pump 20 (i.e., causes admission of the nutrient medium in the pump 20). Furthermore, movement, in a second direction, of the movable part of the pump 20 relative to the chamber of the pump 20 forces transfer of the nutrient medium from the pump 20 to the mixing tank 10 (i.e., exhaust of the nutrient medium from the pump 20 into the mixing tank 10).

Figure 3:
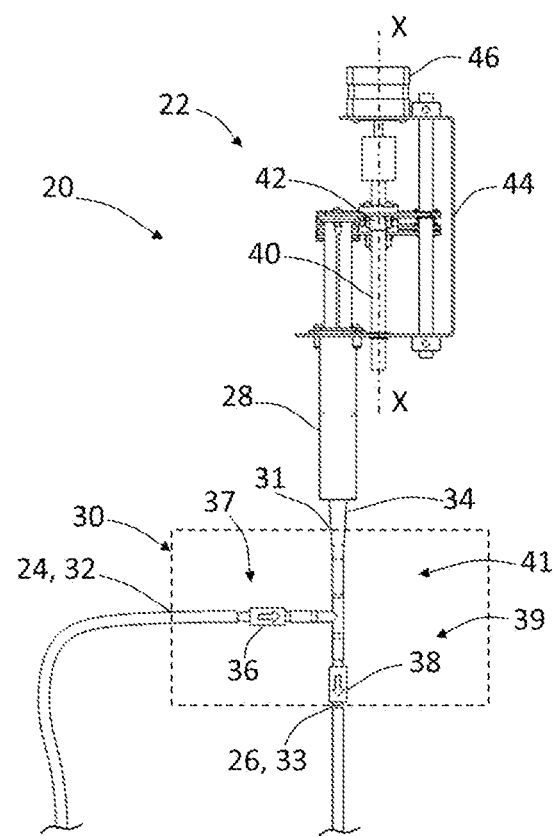
FIG. 3 is a schematic side view of a dosing device of the nutrient dosing system of FIG. 2.

Preferably, the pump 20 is a single-acting reciprocating pump which, for instance, comprises a syringe 28 and a Y-connector 30, as shown on FIG. 3.

In this case, a first port 31 of the Y-connector 30 is fluidly connected to a main port 34 of the syringe 28. Moreover, a second port 32 of the Y-connector 30 forms the inlet port 24 of the pump 20 and a third port 33 of the Y-connector 30 forms the outlet port of the pump 20.

Moreover, in this case, the Y-connector 30 includes a first check valve 36 arranged in a first branch 37 of the Y-connector 30, and a second check valve 38 arranged in a second branch 39 of the Y-connector 30. The first branch 37 and the second branch 39 of the Y-connector 30 are distinct from a third branch 41 of the Y-connector 30 that is connected to the syringe 28.

More precisely, the first check valve 36 and the second check valve 38 are arranged in their respective branches 37, 39 of the Y-connector 30 so that the second check valve 38 prevents flowing of nutrient medium between the first port 31 and the outlet port 26 when the nutrient medium flows from the inlet port 24 to the first port 31 through the first check valve 36.

Furthermore, the first check valve 36 and the second check valve 38 are arranged in their respective branches 37, 39 of the Y-connector 30 so that the first check valve 36 prevents flowing of nutrient medium between the first port 31 and the inlet port 24 when the nutrient medium flows from the first port 31 to the outlet port 26 through the second check valve 38.

Actuator 22

As mentioned previously, the actuator 22 is configured to actuate the respective pump 20. More precisely, the actuator 22 actuates the respective pump 20 based on instructions received from the controller 14.

As a result, based on the instructions received from the controller 14, the actuator 22 causes the pump 20 to either:

load the nutrient medium from the corresponding nutrient tank 18; or inject a target amount of nutrient medium into the mixing tank 10.

Preferably, the actuator 22 is a linear actuator configured to displace the movable part of the pump 20 relative to its chamber.

For instance, in this case, the linear actuator 22 is a screw actuator, as shown on FIG. 3.

More precisely, the linear actuator 22 includes a nut 40 coupled to a threaded rod 42. Preferably, the movable part of the pump 20 is fixed to the nut 40. Moreover, the chamber of the pump is fixed to a support element 44 of the threaded rod 42.

In this case, the actuator 22 includes a motor 46 coupled to the threaded rod 42 to cause rotation of the threaded rod 42 about its longitudinal axis X-X, thereby entailing translation of the nut 42 (and, therefore, the movable part of the pump 20) along said longitudinal axis X-X. On the other hand, the chamber of the pump 20 remains motionless.

Operation of the motor 46 is controlled by controller 14.

Such design allows for a fine control over the amount of nutrient medium that is injected in the mixing tank 10. More precisely, a precision of less than 0.5 mL has been demonstrated.

Such design also leads to low loads on the motor 46, thereby reducing wear and increasing reliability.

Figure 4:
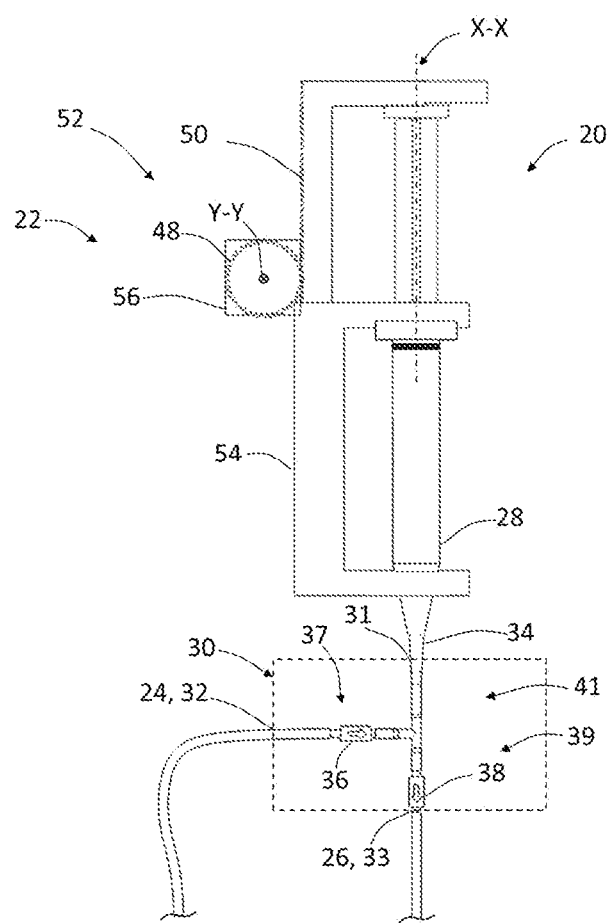
FIG. 4 is a schematic side view of another embodiment of the dosing device of the nutrient dosing system of FIG. 2.

Alternatively, as shown on FIG. 4, the linear actuator 22 comprises a pinion 48 coupled to a rack 50 to form a rack and pinion mechanism 52. Preferably, the movable part of the pump 20 is fixed to the rack 50, and the chamber of the pump 20 is fixed to a support element 54 of the pinion 48.

In this case, the actuator 22 includes a motor 56 coupled to the pinion 48 to cause rotation of the threaded rod 42 about its central axis Y-Y, thereby entailing translation of the rack 50 (and, therefore, the movable part of the pump 20) along an axis X-X that is orthogonal to said central axis Y-Y. On the other hand, the chamber of the pump 20 remains motionless.

Operation of the motor 56 is controlled by controller 14.

Controller 14

As mentioned previously, the controller 14 is configured to control operation of each dosing device 12.

The controller 14 is configured to control operation of each dosing device 12 based on an electroconductivity of the nutrient solution 15 in the nutrient solution storing tank 8 and the level of nutrient solution in the nutrient solution storing tank 8.

For instance, the controller 14 is configured to control each dosing device 12 based on a target composition of the nutrient solution 15 to be obtained, i.e., target concentrations of each nutrient in the nutrient solution 15. For instance, the target composition of the nutrient solution 15 depends on a current growth stage of the plants in the growth enclosure 4. Alternatively, or in addition, the target composition of the nutrient solution 15 has a composition that depends on a predetermined nutrient delivery schedule. The current composition of the nutrient solution 15 can be determined in the nutrient solution storing tank 8 and compared to the target composition of the nutrient solution 15. For example, the current composition of the nutrient solution 15 in the nutrient solution storing tank 8 is determined based on the measure of the electroconductivity in the nutrient solution storing tank 8: in the event where the electroconductivity of the nutrient solution 15 in the nutrient solution storing tank 8 is outside a predetermined range, the controller 14 is configured to control operation of each dosing device 12, based on a target composition of a predetermined concentrated nutrient solution, so that a concentrated nutrient solution is obtained in the mixing tank 10 and transferred to the nutrient solution storing tank 8.

For instance, in the event where the electroconductivity of the nutrient solution 15 in the nutrient solution storing tank 8 is outside a predetermined range, while the level of the nutrient solution in the nutrient solution storing tank 8 is above the predetermined trigger level, the controller 14 is configured to control operation of each dosing device 12, based on a target composition of a predetermined concentrated nutrient solution, so that a concentrated nutrient solution is obtained.

Indeed, the inventors have noticed that, for some plants, the nutrient solution quickly undergoes a change in electroconductivity (i.e., in nutrient content) without changes in the nutrient solution level, that is to say without having the plants absorb the solvent. This results in a nutrient solution that is devoid of nutrients, while the level of nutrient solution is not low enough to trigger the controller 14 to control mixing of a new batch of fresh nutrient solution.

Moreover, the presence of the mixing tank 10 in combination with the nutrient solution storing tank 8 is advantageous compared to the injection of concentrated nutrient solution directly in the flow of nutrient solution that is distributed to the roots. Indeed, the mixing tank 10 allows a complete homogenization of the concentrated nutrient solution before the transfer of the homogenized solution in the nutrient solution storing tank 8. The measure of the electroconductivity inside the nutrient solution storing tank 8 instead of in the flow of the solution after the distribution of the plants or in a sample of the solution allows a measure that is averaged in the whole volume in the nutrient solution storing tank. This results in a measure that is less subject to local variations so that error on the measure is reduced and the preparation of the concentrated nutrient solution is more precise.

Furthermore, when the overall growth enclosures 4 are connected in parallel to the same nutrient dosing system 6, the measure of electroconductivity in the nutrient solution storing tank 8 of each growth enclosures 4 allows to adjust the injection of concentrated nutrient solution to the need of the different plants installed in each growth enclosures 4. Indeed, some plants retain more nutrients while not reducing a lot the volume of the solution. Conversely, other plants retain more water of the solution but do not retain much nutrients. The combined measure of the electroconductivity and level of solution allows to adjust the injection of water or nutrient specifically to each plant.

For instance, the controller 14 is configured to control each dosing device 12 and, preferably, the solvent valve 19, so that nutrient solution is mixed then transferred to the nutrient solution storing tank 8, if the level (or whether a free surface) of nutrient solution in the nutrient solution storing tank 8 is below the predetermined trigger level. This ensures that nutrient solution is always available to plants in the nutrient solution storing tank 8.

More precisely, for at least one dosing device 12, the controller 14 is configured to control the respective actuator 22 to cause the respective pump 20 to:

load the nutrient medium from the corresponding nutrient tank 18; and inject a target amount of nutrient medium into the mixing tank 10.

For instance, the current composition of the nutrient solution 15 can be determined in the mixing tank 10 and compared to the target composition of the nutrient solution 15. For example, the current composition of the nutrient solution 15 in the mixing tank 10 is determined based on the measure of the electroconductivity in the mixing tank 10.

In particular, each target composition is associated, for each dosing device 12, to a corresponding displacement of the respective actuator 22 so that the target amount of the corresponding nutrient medium is injected in the mixing tank 10.

Advantageously, the controller 14 is configured to control injection of a predetermined amount of solvent in the mixing tank 10 during mixing of the nutrient solution (i.e., either before, during or after injection of each nutrient medium). Consequently, a predetermined volume of solvent and predetermined amounts of nutrient media are injected in the mixing tank 10, and the composition of the nutrient solution is consistent over time. For instance, the controller 14 is configured to control the solvent valve 19 during mixing of the nutrient solution so that it remains open until the measurement signal indicates that the level of nutrient solution (or solvent, if the mixing tank 10 does not contain nutrient medium yet) in the mixing tank 10 has reached the predetermined high level.

Advantageously, the controller 14 is configured to control operation of each dosing device 12 based on each measurement signal received from the or each sensor.

For instance, the controller 14 is further configured to determine, based on the measurement signal, whether a solution in the mixing tank is compliant with a predetermined target composition.

In this case, the controller 14 is configured to estimate a present composition of the nutrient solution 15 in the mixing tank 10 based on an electroconductivity and/or a pH value of the nutrient solution 15 in the mixing tank 10. In this case, the controller 14 is configured to control operation of each dosing device 12 so that the current composition of the nutrient solution 15 in the mixing tank 10 reaches a target composition.

Preferably, the relative proportion of nutrients in the concentrated nutrient solution corresponds to that of the target nutrient solution currently in the nutrient solution storing tank 8, the difference lying in the final concentration of the obtained nutrient solution. More precisely, the concentration of the nutrients in the concentrated nutrient solution is higher than that of the associated target nutrient solution.

Furthermore, the controller 14 is advantageously configured to control injection of a predetermined amount of solvent in the mixing tank 10 during mixing of the concentrated nutrient solution. For instance, the controller 14 is configured to open the solvent valve, and to cause the solvent valve to return to its closed position when the measurement signal indicates that the level of nutrient solution (or solvent) in the mixing tank 10 has reached the predetermined low level.

The controller 14 is further configured to control the discharge valve 9 so that the concentrated nutrient solution is transferred to the nutrient solution storing tank 8.

Advantageously, the controller 14 is configured to control operation of each dosing device 12 and the discharge valve 9 to iteratively obtain concentrated nutrient solution, then transfer the obtained concentrated nutrient solution to the nutrient solution storing tank 8, until the electroconductivity of the new nutrient solution (i.e., the old nutrient solution mixed with the freshly prepared concentrated solution) in the nutrient solution storing tank 8 falls within the predetermined range.

This is advantageous, since such operation avoids emptying the nutrient solution storing tank 8 every time the electroconductivity is outside the predetermined range, to replace it with fresh target nutrient solution, thereby saving solvent.

Preferably, the controller 14 is configured to control the nutrient solution storing tank 8 so as to drain (i.e., discharge) the nutrient solution at predetermined time intervals. This is advantageous, as the conductivity measurement does not give access to an actual composition of the nutrient solution, nor does it allow to quantify a composition drift over time in the nutrient solution.

Conversely, if the electroconductivity of the nutrient solution 15 in the nutrient solution storing tank 8 is above a predetermined limit (which may be due to the plants absorbing, in proportion, more solvent than nutrients), the controller 14 is preferably configured to control supplying solvent to the nutrient solution storing tank 8 until the electroconductivity of the nutrient solution is below the predetermined limit.

Preferably, the controller 14 is also configured to determine a current pH of the nutrient solution 15 in the mixing tank 10 based on the corresponding measurement signal. In this case, the controller 14 is further configured to control an injection, in the mixing tank 10, of a pH regulation agent, by controlling operation of at least one dosing device 12 that includes a pH regulation tank.

Optionally, if the controller 14 detects that, in the nutrient solution storing tank 8, the pH reaches values outside a predetermined pH range, the controller 14 may be configured to control each dosing device 12, based on a target composition, so that a new nutrient solution 15 is obtained. This is advantageous, since such pH outside the predetermined pH range may be indicative of a degradation of the nutrient solution in the mixing tank 10.

Advantageously, the controller 14 is also configured to control, during a cleaning phase, an injection of cleaning agent in the mixing tank 10, which is then transferred to the nutrient solution storing tank 8. In this case, the controller 14 is configured to control an injection of the cleaning agent in the mixing tank 10, by controlling operation of the or each dosing device 12 that includes a cleaning tank.

In the case where the cleaning tank stores a flush solution, the cleaning phase results in the circulation, in, at least part of the plant growth assembly 2, of a solution that is intended to dissolve nutrient crystals that may have accumulated in the assembly. For instance, such crystals may accumulate on the roots of the plants in the growth enclosure 4, thereby increasing energy required to absorb said nutrients, and consequently reducing yield. The circulation of such flush solution also results in cleaning of tubing, as well as cleaning of the nozzles that spray the nutrient solutions on plant roots.

For instance, the controller 14 is configured to perform such injection of cleaning agent at regular time intervals.

Alternatively, or in combination, the controller 14 is configured to perform such injection of cleaning agent every time the plants in the growth enclosure 4 are changed, and/or when the target composition of the nutrient solution 15 is modified.

Alternatively, or in combination, the controller 14 is configured to perform such injection of cleaning agent when clogging of the nozzles is detected. Such clogging may be automatically determined based on a comparison between a volume of nutrient solution sprayed by the nozzles and a volume of nutrient solution sent to the nozzles.

Operation

Operation of the nutrient dosing system 6 will now be described.

The electroconductivity of the nutrient solution 15 in the nutrient solution storing tank 8 and the level of nutrient solution in the nutrient solution storing tank 8 are measured.

When there is a need for nutrient solution, for instance when a level of nutrient solution in the nutrient storing tank is below a predetermined trigger level or when the electroconductivity of the nutrient solution 15 in the nutrient solution storing tank 8 is outside a predetermined range, a dosing step is performed.

During the dosing step, the controller 14 controls, based on the measurement signal, the actuator 22 of at least one dosing device 12 to cause the respective pump 20 to:
load the nutrient medium from the corresponding nutrient tank 18;
inject a target amount of nutrient medium into the mixing tank 10 so as to obtain a concentrated nutrient solution; and
transfer the concentrated nutrient solution to the nutrient solution storing tank (8).

Each dosing device 12 is chosen based on a target composition of the nutrient solution to be provided to the growth assembly 4. Furthermore, each target amount of nutrient depends on the target composition of the nutrient solution to be provided to the growth assembly 4.

Preferably, during the dosing step, the mixing container 10 contains a solvent, preferably water.

For instance, during the dosing step, or prior to the dosing step, the controller 14 controls a state of the solvent valve, so that a level of solvent in the mixing 10 tank reaches a predetermined high level.

Advantageously, during the dosing step, the controller 14 further activates the mixer 16 of the mixing tank 10 to agitate the solvent and each nutrient medium injected in the mixing tank 10.

Moreover, during the dosing step, the controller may determine, based on each measurement signal received from the tank 10, whether the nutrient solution 15 in the mixing tank 10 is compliant with a predetermined target solution.

If not, the controller 14 further controls operation of each dosing device 12 until the composition of the nutrient solution 15 in the mixing tank is compliant with the predetermined target solution.

Preferably, during a correction step that follows the dosing step, the controller 14 determines a pH of the nutrient solution 15 based on the measurement signal. If the pH of the nutrient solution 15 is outside a predetermined pH range, the controller 14 controls operation of at least one dosing device 12 that includes a pH regulation tank to inject the appropriate pH regulation agent in the mixing tank 10 so that the pH of the nutrient solution belongs to the predetermined pH range.

The invention claimed is:

1. A plant growth assembly comprising:
at least one growth enclosure for housing plants, and
at least one nutrient dosing system fluidly connected to the at least one growth enclosure, the nutrient dosing system, comprising:
   a mixing tank for receiving a solvent and at least one nutrient medium;
   at least one dosing device, each dosing device being fluidly connected to the mixing tank, each dosing device comprising:
      a nutrient tank for storing a nutrient medium;
      a pump having an inlet port fluidly connected to the corresponding nutrient tank, and an outlet port fluidly connected to the mixing tank; and
      an actuator configured to actuate the pump;
   a controller,
wherein, for each dosing device, the pump is a reciprocating pump for providing a pushing force through a positive displacement of the reciprocating pump,
wherein the mixing tank is fluidly connected to a nutrient solution storing tank configured for storing at least one nutrient solution,
wherein the nutrient dosing system, comprises at least one sensor configured to output a measurement signal representing at least:
   an electroconductivity of the nutrient solution in the nutrient solution storing tank; and
   whether a free surface of the nutrient solution in the nutrient solution storing tank is below a predetermined trigger level,
wherein the controller is configured to, for at least one dosing device and based on the measurement signal, control the respective actuator to cause the corresponding pump to:
   load the nutrient medium from the corresponding nutrient tank; and
   inject a target amount of nutrient medium into the mixing tank
   so as to obtain a concentrated nutrient solution; and
   transfer the concentrated nutrient solution to the nutrient solution storing tank,
wherein the growth enclosure comprises nozzles arranged to pulverize, on said plants, the nutrient solution stored in the nutrient solution storing tank,
wherein the nutrient solution storing tank is arranged at a bottom of the growth enclosure to recuperate the nutrient solution sprayed on the plants by the nozzles above the nutrient solution storing tank but not absorbed by the plants.

2. The plant growth assembly according to claim 1, wherein the controller is further configured to, if the electroconductivity of the solution in the nutrient solution storing tank is outside a predetermined range, and the level of the solution in the nutrient solution storing tank is above the predetermined trigger level:
   control each dosing device to inject a target amount of nutrient medium into the mixing tank so as to obtain a concentrated solution having a nutrient concentration that is higher than a target concentration associated to the solution in the nutrient solution storing tank; and
   control a transfer of the obtained concentrated solution from the mixing tank to the nutrient solution storing tank.

3. The plant growth assembly of claim 1, wherein, for at least one dosing device, the actuator is a linear actuator configured to move a movable part of the pump relative to a chamber of the pump in a first direction to force transfer of the nutrient medium from the nutrient tank to the pump, or in a second direction to force transfer of the nutrient medium from the pump to the mixing tank.

4. The plant growth assembly of claim 3, wherein:
   the linear actuator is a screw actuator including a nut coupled to a threaded rod, the movable part of the pump being fixed to the nut, and the chamber of the pump being fixed to a support element of the threaded rod; or
   the linear actuator comprises a pinion coupled to a rack to form a rack and pinion mechanism, the movable part of the pump being fixed to the rack, and the chamber of the pump being fixed to a support element of the pinion.

5. The plant growth assembly according to claim 1, wherein the pump is single-acting reciprocating pump.

6. The plant growth assembly according to claim 5, wherein the pump is single-acting reciprocating pump comprising a syringe and a Y-connector,
   a first port of the Y-connector being fluidly connected to a main port of the syringe, a second port of the Y-connector forming the inlet port of the pump and a third port of the Y-connector forming the outlet port of the pump,
   the Y-connector including a first check valve and a second check valve each arranged in a respective branch of the Y-connector to:
   prevent flowing of nutrient medium between the first port and the outlet port when the nutrient medium flows from the inlet port to the first port; and
   prevent flowing of nutrient medium between the first port and the inlet port when the nutrient medium flows from the first port to the outlet port.

7. The plant growth assembly according to claim 1, wherein the mixing tank includes a mixer to agitate the solvent and each received nutrient medium.

8. The plant growth assembly according to claim 1, wherein the measurement signal further represents at least:
   a pH value of a solution in the mixing tank;
   an electroconductivity of the solution in the mixing tank;
   whether a free surface of the solution in the mixing tank is below a predetermined low level; and/or
   whether the free surface of the solution in the mixing tank is above a predetermined high level,
   the controller being further configured to determine, based on the measurement signal, whether a solution in the mixing tank and/or the nutrient solution storing tank is compliant with a predetermined target composition.

9. The plant growth assembly according to claim 8, wherein the controller is further configured to control, based on the measurement signal, an injection, in the mixing tank of at least one of a pH regulation agent, at least one nutrient medium, and the solvent.

10. The plant growth assembly according to claim 1, further comprising a cleaning tank configured to store a cleaning liquid, the cleaning tank being fluidly connected to the mixing tank, the controller being further configured to control, during a cleaning phase, an injection of cleaning liquid from the cleaning tank to the mixing tank.

* * * * *